Sept. 1, 1936. S. L. KERR 2,052,572
VALVE MECHANISM
Filed Nov. 10, 1933
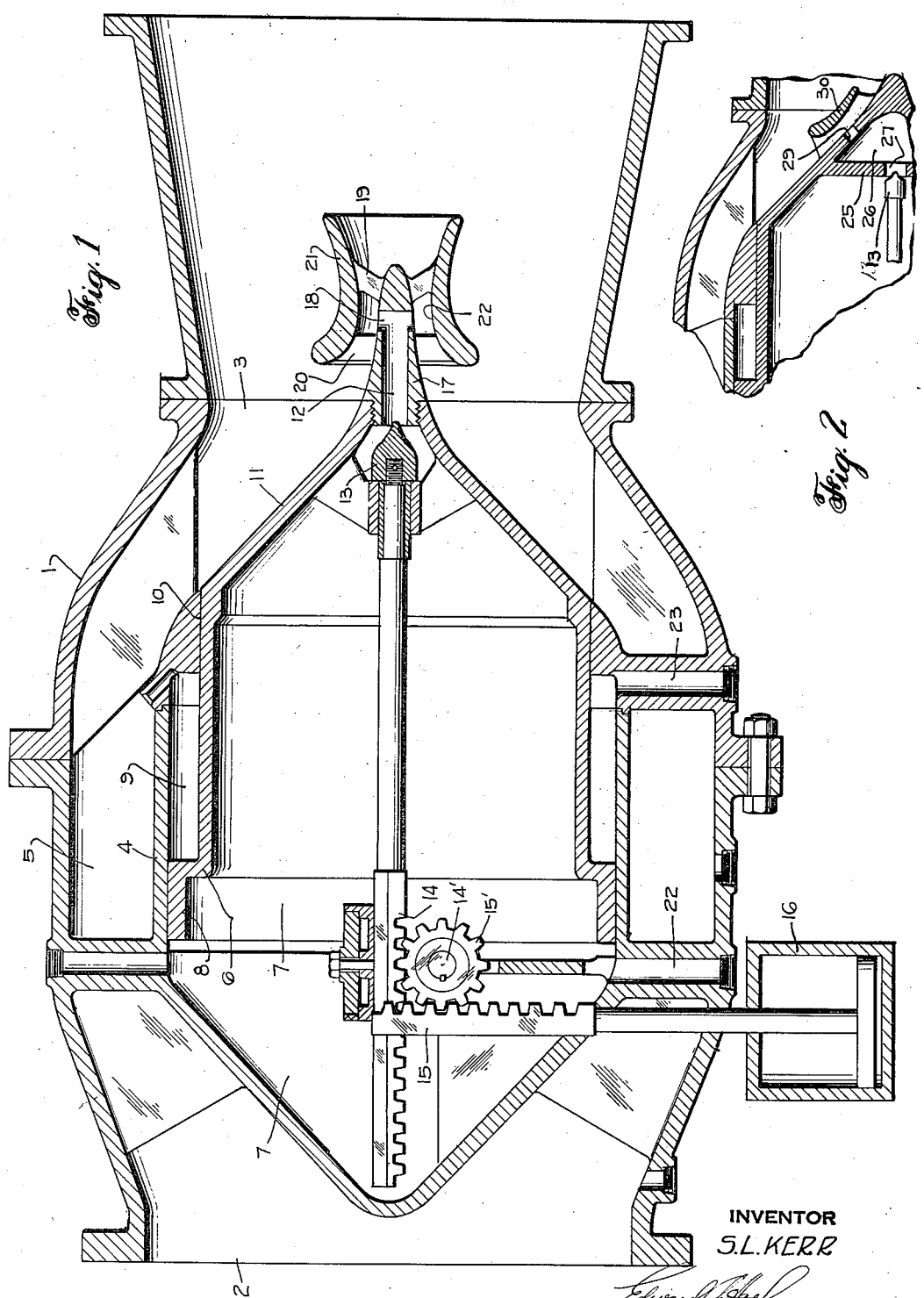
INVENTOR
S.L. KERR
ATTORNEY Patented Sept. 1, 1936

2,052,572

UNITED STATES PATENT OFFICE 2,052,572

VALVE MECHANISM

Samuel Logan Kerr, Philadelphia, Pa., assignor to Baldwin-Southwark Corporation, a corporation of Delaware Application November 10, 1933, Serial No. 697,517

4 Claims. (Cl. 137—139)

This invention relates generally to fluid operated valve mechanisms of the type wherein the operating fluid has communication with the fluidway of the valve or conduits and relates more particularly to improved means whereby this communication is maintained for either direction of flow past the valve.

The specific embodiment of the invention is shown herein as applied to a plunger type valve, especially of the Larner-Johnson type, although it will of course be understood that the invention is equally applicable to other types of valves where similar operating conditions are encountered. The valve as shown herein comprises inner and outer stationary casings spaced to form an annular fluid passageway while a movable plunger has telescopic relation to the inner casing to form an internal fluid chamber adapted to cause a closing fluid pressure force on the plunger. Opening chambers may be provided in various forms but in any event the internal chamber preferably has communication with the fluidway through a suitable opening in the plunger face. Specifically a single central opening is shown in the form of a pilot valve controlled orifice, although if it is necessary to employ several openings, then each of the same may be provided with my improved arrangement.

In normal operation of the plunger valve, fluid flows past the plunger orifice in a downstream direction whereby fluid from the internal chamber may be effectively discharged to the fluidway. If reverse flow should occur in the pipe line, then water would normally enter this orifice and tend to build up pressure within the internal chamber. Under certain circumstances it is desirable to avoid having the reverse flow build up pressure in the internal chamber and also it is desirable upon reverse flow to have the same conditions for discharge of water from the internal chamber to the fluidway as is present during normal flow.

It is one object of my invention to provide improved means whereby a valve operating chamber may have substantially the same operative relation to the fluidway for either direction of fluid flow therethrough.

In one aspect of the invention, a communicating passage between the valve chamber and fluidway is provided with an auxiliary passage offset from the communicating passage so that the fluid flow in either direction through the auxiliary passage will have the same effect on the communicating passage whereby it may discharge with equal facility under either direction of fluid flow in the pipe line.

Specifically, I provide a deflector over the end of the plunger orifice in spaced relation thereto but otherwise forming a smooth continuation of the plunger nose, thereby providing a lateral passage from the plunger orifice whereby the fluid flow in either direction past this lateral passage will have the same effect. This function is augmented by providing an annular member tapering inwardly from each end toward a point adjacent said lateral passage thereby to provide a Venturi effect in either direction of fluid flow therethrough so as to produce a pressure drop at the lateral passage. This will facilitate discharge of pressure from the internal chamber in either direction of flow.

Other objects and advantages will be more apparent to those skilled in the art from the following description of the accompanying drawing in which:

Fig. 1 is a longitudinal section through one form of valve showing one application of my invention;

Fig. 2 is a fragmentary view of a modification showing my invention applied to a plunger valve having one or more orifices in the face of the plunger rather than at the nose thereof.

In the illustrated embodiments of the invention which are shown herein merely for the purpose of disclosing one specific form among possible others that the invention might take, I have provided a Larner-Johnson type of valve having an outer stationary cylindrical casing 1 provided with coaxial inlet and outlets 2 and 3. An inner stationary cylindrical casing 4 is supported by suitable ribs in spaced relation to casing 4 to provide an annular fluid passageway 5. A plunger 6 is telescopically disposed in casing 4 to provide an internal chamber 7. A second chamber is also preferably provided by an annular piston-like flange 8 thereby forming an annular chamber 9 which may have communication with the fluidway either by usual leakage at the joint 10 or by an external pipe depending upon the particular purpose for which the valve may be used.

The plunger is provided with a closed face 11 having a nose orifice 12 normally controlled by a pilot valve 13. This valve is provided with a valve stem so as to be moved relative to orifice 12 as by a rack and pinion 14. A pinion shaft 14', extending outwardly through the valve casing 1, carries an external second pinion 15' rotated by rack 15 which is actuated by any suitable external source of power such as a piston and cylinder servo-motor 16 although other forms of operating means may be employed. For clarity and simplicity, elements 15, 15' and 16 are shown in full against the sectioned valve.

Formed as a substantially smooth continuation of the plunger face is a member 17 somewhat in the nature of a deflector but in any event is provided with a lateral passageway 18 communicating with orifice 12. This lateral passageway may comprise one or more blades of any suitable cross-section. Supported in spaced relation to the plunger nose, as by a series of straight radial ribs 19 and 20, is a circular member 21 of gradually decreasing cross-sectional area from each end thereof to a point where a throat 22 is formed in the general locality of passage 18. Depending upon circumstances, this throat may be placed in the same plane as passage 18 or offset therefrom, but in either case it is seen that irrespective of the direction of flow through the valve a Venturi action is created adjacent lateral passage 18 and hence fluid pressure in internal chamber 7 may be effectively discharged in either direction of fluid flow through the pipe line. Hence the valve is susceptible to very accurate and positive operation by usual manual or automatic control devices.

Fluid pressure may be normally supplied to the internal chamber through passage 22, and this pressure may be discharged through the orifice 12 and venturi 21. A fluid passage 23 may communicate with the annular chamber 9. Passages 22 and 23 may be controlled by either manually or automatically controlled valves as is disclosed in various patents heretofore issued.

In Fig. 2 the plunger is provided with a partition 25 to form a small nose chamber 26. This chamber communicates with the internal plunger chamber through a pilot valve controlled orifice 27 corresponding to orifice 12 in the preferred form. The small chamber communicates with the fluid passageway through one or more openings 29 in the plunger face. Each of these openings is provided with a channel forming member 30. The passageway of this channel converges from its opposite open ends toward the opening to provide a Venturi effect in either direction of fluid flow past the opening in the valve face, thereby to facilitate discharge of pressure from the small chamber in either direction of flow. It will of course be understood that the Venturi channel with its open ends extends in the direction of flow and that this channel member may be bolted to the plunger face or cast integrally therewith if so desired.

While I have shown two specific forms of the invention, it will of course be understood that the invention may take other forms and that the elements thereof may be changed in various details and applied to valves of different types and also used for different applications without departing from the spirit of the invention as set forth in the appended claims.

I claim:

1. A valve mechanism having a fluid passageway and a movable valve element for controlling said passageway, means providing a fluid chamber for the valve, means providing communication between said chamber and passageway, and means entirely movable with said valve element to provide a Venturi passage for said communicating means in either direction of fluid flow through said passageway.

2. A valve mechanism having a fluid passageway and a movable valve element therein, a fluid chamber for said valve element, a passage movable with said element and communicating with said chamber and passageway, and a Venturi element entirely movable with said valve element and associated with said passage in spaced relation thereto to maintain a relatively low pressure adjacent the same in either direction of fluid flow through said valve.

3. A plunger type valve adapted when in normal open position to have a substantially free flow passageway, an orifice in the nose of said plunger, and means movable entirely with said plunger for effecting a relatively low pressure adjacent said orifice in either direction of fluid flow through said valve.

4. A plunger valve mechanism having a plunger provided with a nose, a pilot valve controlled plunger orifice in said nose, said orifice terminating in a lateral passage, and means encircling the end of said plunger nose adjacent said lateral passage to permit discharge of fluid through said orifice in either direction of fluid flow through said valve mechanism.

SAMUEL LOGAN KERR.